United States Patent [19]

Shimokawa et al.

[11] 4,268,638

[45] May 19, 1981

[54] PROCESS FOR THE PREPARATION OF RUBBER-MODIFIED THERMOPLASTIC RESINS

[75] Inventors: Shin-ichi Shimokawa, Yokkaichi; Yuji Yamamoto, Suzuka; Hisao Nagai, Yokkaichi, all of Japan

[73] Assignee: Japan Synthetic Rubber Co., Ltd., Tokyo, Japan

[21] Appl. No.: 112,712

[22] Filed: Jan. 16, 1980

[30] Foreign Application Priority Data

Jan. 19, 1979 [JP] Japan ................................. 54/3981

[51] Int. Cl.³ .......................................... C08F 255/06
[52] U.S. Cl. .................................. 525/263; 525/264; 525/289; 525/316
[58] Field of Search ................................ 525/263, 264

[56] References Cited

U.S. PATENT DOCUMENTS

| | | | |
|---|---|---|---|
| 3,489,821 | 1/1970 | Witt et al. | 525/76 |
| 3,489,822 | 1/1970 | Witt et al. | 525/263 |

FOREIGN PATENT DOCUMENTS

| | | |
|---|---|---|
| 47-8220 | 9/1972 | Japan . |
| 49-1956 | 1/1974 | Japan . |
| 49-2026 | 1/1974 | Japan . |
| 49-2027 | 1/1974 | Japan . |

OTHER PUBLICATIONS

Plasdoc 10379v/06.

*Primary Examiner*—Stanford M. Levin
*Attorney, Agent, or Firm*—Oblon, Fisher, Spivak, McClelland & Maier

[57] ABSTRACT

A process for the preparation of a rubber-modified thermoplastic resin, which comprises treating an ethylene-propylene-non-conjugated diene copolymer rubber with a peroxide in a hydrocarbon or halogenated hydrocarbon solvent to obtain a rubber solution with a rubber gelation degree of not more than 5% and containing substantially no unreacted peroxide, adding to this rubber solution a vinyl monomer consisting of an aromatic alkenyl compound and a polar vinyl compound, and heating the resulting mixture to graft-copolymerize the monomer on the rubber. The resin obtained according to this process is free of fish eyes and proof against delamination of shaped article and has excellent mechanical properties, excellent appearance when shaped and high weather resistance.

18 Claims, No Drawings

PROCESS FOR THE PREPARATION OF RUBBER-MODIFIED THERMOPLASTIC RESINS

This invention relates to a process for producing a rubber-modified thermoplastic resin which is free from fish eye and delamination of shaped article and has excellent mechanical properties, excellent appearance when shaped and high weather resistance, and more particularly, it relates to a method for producing a graft copolymer by copolymerizing an aromatic vinyl compound and a vinyl cyanide compound in the presence of an ethylene-propylene-non-conjugated diene copolymer rubber (hereinafter referred to as EPDM). This invention aims particularly at improving the phenomenon of delamination and appearance of shaped article.

It is known that EPDM has excellent weather and ozone resistance, and many proposals have been made concerning the process for producing a thermoplastic graft copolymer having excellent mechanical properties and weather resistance through graft copolymerization of a vinyl monomer on the EPDM by taking advantage of said properties of EPDM. It has been generally considered that EPDM can produce only resins of a low impact strength because it has a little crosslinked structure in its rubber component and it is impossible to adjust the proportion of the structure. As a solution to this problem, it has been proposed to first treat the rubber component with oxygen, ozone, an organic peroxide or the like to have a suitable amount of crosslinked structure and then graft copolymerize styrene, acrylonitrile or the like on EPDM (Japanese Patent Publication Nos. 8220/72, 2026/74 and 2027/74). It is also difficult to carry out the graft reaction in a high yield because the content of the unsaturated groups in the rubber component is extremely low and the main chain structure is composed of saturated hydrocarbons. The resins obtained from EPDM, therefore, are usually apt to suffer delamination of shaped article (a phenomenon that the surface of a shaped article is easily peeled in the form of a layer) and can hardly stand practical uses. In order to solve this problem, there has been proposed a method in which the rubber solution is first heated in the presence of oxygen, ozone, an organic peroxide, an azo compound or the like to produce a peroxide or peroxyhydrate of rubber and then this product is decomposed in a known manner such as thermal decomposition or redox decomposition, thereby obtaining the desired graft copolymer with a high efficiency (U.S. Pat. No. 3,489,821 and Japanese Patent Publication No. 1956/74).

However, even if the EPDM thus treated is copolymerized with an aromatic vinyl compound and a vinyl cyanide compound, there can hardly be obtained a product which is provided with all of the required properties such as mechanical strength, good appearance of shaped article, etc. If the rubber component is allowed to have a crosslinked structure by a technique such as proposed in Japanese Patent Publication Nos. 8220/72, 2026/74 and 2027/74, it is difficult to disperse the rubber particles uniformly and finely in a matrix by mass or solution polymerization, and it is impossible, therefore, to obtain a homogenous polymer, which is accompanied by such disadvantages as reduction in luster of shaped article, and the like. Also, when the grafting degree is improved by formation of a peroxide or peroxyhydrate in the rubber component by such a method as disclosed in U.S. Pat. No. 3,489,822 and Japanese Patent Publication No. 1956/74, the active groups formed are so unstable that they disappear depending on the treating conditions such as treating time or treating temperature and other conditions such as those for separation of the rubber component from the solution, and the like, and therefore, it becomes impossible to achieve the desired object. It is a more important matter that in the case of a method in which a treating agent such as an organic peroxide, an azo compound or the like is used, effecting the graft copolymerization in the presence of said treating agent as it remains results in the formation of a large amount of homopolymer of the monomer and its crosslinked product (micro-gel) rather than the desired graft copolymer, and particularly the micro-gel of the homopolymer of the monomer causes bad appearance of shaped articles such as silver streak in injection molding, fish eye in sheet forming, and the like.

In view of the above, the present inventors have made extensive research on a further improvement of the EPDM treating method and the graft copolymerization method and, as a result, it has been found that it is possible to obtain a graft copolymer which is free from delamination of shaped article, excellent in impact strength and luster, low in gel formation and also excellent in sheet formability, by first treating the EPDM dissolved in a solvent with a peroxide and then graft-copolymerizing a vinyl monomer thereon under the conditions satisfying the following three requirements:

(1) The gelation degree (toluene-insolubles content at 25° C.) of EPDM is kept not more than 5%.

(2) Substantially no unreacted peroxide remains in the rubber solution.

(3) The graft copolymerization reaction is accomplished by thermal polymerization in the absence of any polymerization initiator.

It has also been found that the gelation degree of EPDM at the stage of the peroxide treatment and the grafting degree in the copolymerization reaction are in inverse proportion to each other, and this has revealed that even if a radical is formed on the rubber by the peroxide treatment, no desired improvement in grafting degree can be achieved if such a radical is consumed by the crosslinking reaction or other reactions, and hence it is a very important factor to properly set the treating time and temperature in correspondence to the type and amount of the peroxide used. This is quite a surprising finding in comparison with the fact that the crosslinked structure has been regarded as an essential condition or the matter of course in the past proposals on the subject matter.

Further, it has not been recognized in the art that the presence of the polymerization initiator in the graft reaction causes the formation of the crosslinked product of the homopolymer of the monomer, and this results in bad appearance of shaped article.

This finding, coupled with the above-mentioned knowledge of the treatment with a peroxide, has enabled the inventors to reach this invention.

An object of this invention is to provide a process for producing a rubber-modified thermoplastic resin by graft-polymerizing a vinyl monomer on the rubber.

Another object of this invention is to provide a process for the preparation of a rubber-modified thermoplastic resin which has a high impact strength, an excellent luster and a good sheet-formability.

Other objects and advantages of this invention will become apparent from the following description.

According to this invention, there is provided a process for the preparation of a rubber-modified thermoplastic resin which comprises treating an ethylene-propylene-non-conjugated diene copolymer rubber with a peroxide in a hydrocarbon or halogenated hydrocarbon solvent to obtain a rubber solution having a gelation degree of not more than 5% and containing substantially no unreacted peroxide therein, then adding to this rubber solution a vinyl monomer consisting of an aromatic vinyl compound and a polar vinyl compound, and then heating the resulting mixture to graft-polymerize said monomer on the rubber.

The term "ethylene-propylene-non-conjugated diene copolymer rubber" used herein refers to the rubber-like copolymers consisting of ethylene, propylene and a non-conjugated diene selected from the group consisting of norbornenes, cyclic dienes and aliphatic dienes. The ethylene:propylene molar ratio in the rubber is preferably within the range of 5:1 to 1:3. Preferred examples of the non-conjugated diene used in this invention are 5-ethylidene-2-norbornene and dicyclopentadiene, and the proportion of the non-conjugated diene in the copolymer is preferably within the range of 5 to 40 in terms of iodine value.

The hydrocarbon or halogenated hydrocarbon solvent used in the treatment with a peroxide is preferably selected from the aromatic hydrocarbons and their halides, the typical examples of which are benzene, toluene, ethylbenzene and chlorobenzene. It is also possible to use aliphatic or alicyclic hydrocarbons and their halides.

For the treatment with a peroxide, there may be used conventional inorganic or organic peroxides such as t-butylperoxy-i-propylcarbonate, t-butylperoxybenzoate, dicumyl peroxide, di-t-butyl peroxide, benzoyl peroxide, lauroyl peroxide, methyl ethyl ketone peroxide, cumene hydroperoxide, etc., and these peroxides may be used either alone or in combination.

The treatment with a peroxide is accomplished by adding 0.1 to 10 parts by weight, preferably 0.4 to 5 parts by weight of a peroxide to 300 to 4,000 parts by weight, preferably 500 to 1,000 parts by weight of a solvent, per 100 parts by weight of the rubber, and stirring the obtained solution with warming. The time and temperature for this treatment are the important factors as mentioned above. They may be varied depending on the type and amount of the peroxide used, but it is essential to select them so that the gelation degree of rubber may be kept not more than 5% and substantially no peroxide may be left in the solution. By the term "substantially no peroxide is left" is meant a state in which the residual amount of the unreacted peroxide as calculated from the half-life period is not more than 0.01 part by weight per 100 parts by weight of the total of the weight of the rubber and the weight of the vinyl monomer graft-copolymerized thereon. If the rubber gelation degree exceeds 5%, the product is inferior in luster and impact strength, and the grafting degree also drops to less than 70%, resulting in a remarkable increase of delamination of shaped article. If the amount of the unreacted peroxide in the rubber exceeds the above-mentioned range, micro-gel are formed to give rise to a large amount of fish eyes. The rubber gelation degree can be determined in the following way: First, the rubber component is separated by means of methanol coagulation from the rubber solution treated with a peroxide, and after drying, 0.3 g of the specimen is immersed in 100 ml of toluene at 25° C. for 16 hours, with sufficient shaking being given to the solution, and after additional 4-hour immersion, the solution is filtered through a 200-mesh wire gauze and the amount of the toluene insolubles is measured in a usual way.

The residual amount of the unreacted peroxide is calculated from the following equation:

$$I = 0.5^{T/t} I_o$$

wherein
I: residual amount (parts by weight) of unreacted peroxide
$I_o$: amount of peroxide added (parts by weight)
T: treating time (hr)
t: half-life period (hr)

The treating time and temperature must be properly set in correspondence to the type and amount of the peroxide used so as to meet the requirements to depress the residual amount (of the unreacted peroxide) to less than 0.01 part by weight per 100 parts by weight of the total of the weight of the rubber and the weight of the vinyl monomer graft-copolymerized thereon and to keep the rubber gelation degree not more than 5%. According to the experimental results, the treating time is usually within the range of 0.5 to 5 hours and the treating temperature is usually within the range of 50° to 180° C.

In this invention, it is important that the graft copolymerization reaction be carried out while maintaining the solution state obtained by adding a vinyl monomer or a vinyl monomer and a solvent to a rubber solution as obtained by treating the rubber with a peroxide in a solvent. It is undesirable to perform the graft copolymerization after the peroxide-treated rubber has been isolated by the alcohol coagulation, steam distillation or other means, because the active group formed on the rubber may disappear in the course of the separation to keep the grafting degree low. The graft copolymerization reaction is carried out with stirring and heating, and the temperature thereof must be properly selected by taking into account the type of the monomer used and the properties of the objective resin, but usually said temperature is within the range of 100° to 200° C. The solvent added in this reaction may be of any type that can be used in the treatment with a peroxide, and may be the same as or different from that used in the treatment with a peroxide. The amount of the solvent added is preferably from 50 to 200 parts by weight in total per 100 parts by weight of the total of the weight of the rubber and the weight of the vinyl monomer. The vinyl monomer used in this invention is composed of an aromatic alkenyl compound and a polar vinyl compound, and styrene, α-methylstyrene, vinyltoluene, halogenated styrene and the like may be used as the aromatic alkenyl compound, while un-saturated nitriles such as acrylonitrile or methacrylonitrile or methacrylic acid esters such as methyl methacrylate may be used as polar vinyl compound. Most preferred is a styrene-acrylonitrile combination used in the weight ratio of from 80:20 to 60:40. As to the mode of addition of the monomer mixture, a prescribed amount thereof may be added all at one time in the rubber solution, or it may be added continuously or in portions.

The ratio of the vinyl monomer to the rubber is preferably so selected that the rubber content in the product resin may be within the range of 5 to 30% by weight. The grafting degree is preferably not less than 70%.

The graft copolymer obtained from the described process of this invention is free from delamination of shaped article, high in impact strength, excellent in luster, low in gel formation and excellent in sheet-formability.

The invention is illustrated in further detail referring to Examples, which are merely by way of illustration and not by way of limitation.

EXAMPLE 1

In a 10-liter stainless steel reactor provided with a paddle agitator, 12 parts by weight of EPDM (JSR EP-33, a trade name of Japan E.P. Rubber) with a Mooney viscosity of 45, an iodine value of 26, and a propylene content of 43 wt% comprising 5-ethylidene-2-norbornene as the diene component was dissolved in 80 parts by weight of toluene, and after further adding 0.2 parts by weight of t-butylperoxy-i-propylcarbonate, the mixture was agitated at 140° C. for one hour. Then, the mixture was cooled down to 50° C., and thereto were added 61.6 parts by weight of styrene, 26.4 parts by weight of acrylonitrile and 0.1 part by weight of t-dodecylmercaptan. The resulting mixture was heated to 140° C. and then subjected to polymerization reaction for 5 hrs. After the reaction, 0.2 part by weight of 2,6-di-tert-butyl-4-ethylphenol and 0.5 part by weight of N,N'-ethylene-bis-stearoamide were added to the reaction mixture, and after removing the solvent and unreacted monomer by steam distillation, the reaction product was pulverized, dried and then pelletized by a 40 mm vented extruder (220° C.). The pellets obtained were then molded into a test specimen by a 50Z injection molder (230° C.) and its properties were assayed. Separately from this test specimen, an approximately 0.05 mm thick sheet was prepared from said pellets by a 30 mm sheet extruder (220° C.) and the number of fish eyes (micro-gels) in the sheet was measured. Further, a tray with a boss was molded from said pellets by a 100Z injection machine (230° C.) and the degree of delamination of shaped article therein was determined. The treating conditions used and the obtained results are shown in Table 1.

EXAMPLES 2-11

The same procedure as in Example 1 was repeated, except that the peroxide treatment conditions were varied. The treating conditions used and the obtained results are also shown in Table 1.

t-Butylperoxy-i-propylcarbonate was used as the organic peroxide for the pre-treatment in Examples 1-3, while dicumyl peroxide was used as said peroxide in Examples 4-6, benzoyl peroxide in Examples 7-8, cumene hydroperoxide in Examples 9-10, and t-butylperoxy-i-propylcarbonate and benzoyl peroxide in Example 11. All the products obtained in these Examples were satisfactory in impact strength, luster, amount of fish eyes and grafting degree.

EXAMPLE 12

The same procedure as in Example 1 was repeated, except that JSR EP-82 (a trade name of Japan E.P. Rubber for EPDM having a Mooney viscosity of 38, an iodine value of 10, a propylene content of 38% and diene component being dicyclopentadiene) was substituted for the EPDM, to obtain the results shown in Table 1.

COMPARATIVE EXAMPLES 1-8

In order to clarify the effects of this invention, the procedure of Example 1 was repeated by using different conditions, which are specified below, to obtain the results shown in Table 2.

In Comparative Examples 1-5, the graft co-polymerization reaction was performed without the peroxide treatment. Further, in Comparative Example 1, the thermal polymerization was carried out without any polymerization initiator as in the case of Example 1, but in Comparative Examples 2-5, said polymerization was conducted with a polymerization initiator as shown in Table 2.

In Comparative Example 6, after treating the rubber solution in the same way as in Example 1, a peroxide was further added as a polymerization initiator in the polymerization reaction.

In Comparative Example 7, the amount of the peroxide added was increased, and in Comparative Example 8, the peroxide treatment time was prolonged.

As apparent from Table 2, the product obtained in Comparative Example 1 had good properties and the amount of fish eyes was small, but the grafting degree was excessively low. Accordingly, delamination of shaped article took place extensively. The resin obtained could not be put in practical use.

In Comparative Examples 2-5, the grafting degree was improved but many micro-gels (and hence many fish eyes) were formed and sheet-formability was very poor. Many fish eyes were also formed in Comparative Example 6.

In Comparative Example 7, the gelation degree of EPDM was as low as 9.7% and both luster and grafting degree were also low. In Comparative Example 8, the gelation degree became 21.9%, and not only luster and grafting degree but also impact strength were low.

COMPARATIVE EXAMPLE 9

The procedure of Example 3 was repeated, except that the peroxide treatment time was shortened, to obtain the results shown in Table 2. As seen from Table 2, the gelation degree of EPDM was as low as 0.5%, and the impact strength, luster and grafting degree were satisfactory, but the residual amount of the unreacted organic peroxide in the rubber solution was as large as 0.015 part by weight according to the calculation and voluminous micro-gels were formed in graft-polymerization. Thus, a clear difference from the products of this invention was seen in the assay of fish eyes.

COMPARATIVE EXAMPLE 10

Reaction was carried out in the same manner as in Example 4, except that the time of rubber treatment with a peroxide was prolonged, to obtain the results shown in Table 2. As seen from Table 2, the gelation degree of EPDM became 5.8%, and this caused reduction of luster and grafting degree.

COMPARATIVE EXAMPLE 11

The procedure of Example 6 was repeated, except that the time of rubber treatment with a peroxide was shortened, to obtain the results shown in Table 2. In this case, the amount of the remaining unreacted organic peroxide was 0.134 part by weight, resulting in an increased number of fish eyes.

COMPARATIVE EXAMPLE 12

The procedure of Example 10 was repeated, except that the time of rubber treatment with a peroxide was shortened, to obtain the results shown in Table 2. In this case, the amount of the remaining unreacted organic peroxide was 0.019 part by weight, and this caused formation of many fish eyes.

COMPARATIVE EXAMPLE 13

A rubber solution treated with a peroxide was prepared in the same manner as in Example 1, and the rubber component was separated from this solution by methanol coagulation, then dried in vacuo at 50° C. for 12 hours and again dissolved in toluene. This solution was subjected to graft-copolymerization in the same manner as in Example 1 to obtain the results shown in Table 2. The grafting degree did not increase and delamination of shaped article was remarkable.

It can be seen from the foregoing results that the three conditions specified in this invention are essential for obtaining products satisfying all the required properties.

Determination of physical properties and analyses in the Examples and Comparative Examples were performed in the following way.

The Izod impact test was conducted according to ASTM D 256-56 and luster was determined according to ASTM D-523.

As for fish eyes, the fish eyes in a 10 cm × 10 cm sheet with a thickness of 0.05 mm were classified and the number thereof was determined based on the dust counting chart.

For determining the rubber gelation degree, the rubber solution treated with an organic peroxide was sampled and the degree of gelation of the sample was determined according to the above-mentioned method.

The grafting degree was determined in the following way: the soluble portion of the graft polymer was extracted with acetone at room temperature and the weight of the residual acetone-insolubles was measured, and assuming that the difference between this measured weight and the weight of the rubbery polymer used for the preparation of the polymer corresponds to the weight of the monomer chemically bonded to the rubbery polymer, the grafting degree was calculated from the following equation:

$$\text{Grafting degree}(\%) = \frac{(\text{wt. of acetone insolubles}) - (\text{wt. of rubbery polymer})}{(\text{wt. of rubbery polymer})} \times 100$$

The degree of delamination of shaped article was determined by bending the injection gate portion of an injection-molded article (bossy tray) and judging with the naked eye the condition of delamination of the surface from the tray body.

TABLE 1

| | Example 1 | Example 2 | Example 3 | Example 4 | Example 5 | Example 6 | Example 7 | Example 8 |
|---|---|---|---|---|---|---|---|---|
| Treatment with peroxide | | | | | | | | |
| Peroxide type | t-Butylperoxy-i-propylcarbonate | t-Butyl-peroxy-i-propyl-carbonate | Same as left | Dicumyl peroxide | Same as left | Dicumyl peroxide | Benzoyl peroxide | Same as left |
| Amount (wt. parts) | 0.2 | 0.2 | 0.05 | 1 | 1 | 0.5 | 1 | 0.5 |
| Treating temperature (°C.) | 140 | 130 | 120 | 160 | 150 | 140 | 110 | 100 |
| Treating time (hr) | 1.0 | 1.0 | 2.5 | 0.5 | 1.5 | 4.0 | 1.0 | 2.0 |
| Graft copolymerization | | | | | | | | |
| Initiator type | — | — | — | — | — | — | — | — |
| Amount (wt. parts) | — | — | — | — | — | — | — | — |
| Polymerization temperature (°C.) | 140 | 140 | 140 | 150 | 150 | 150 | 150 | 150 |
| Polymerization time (hr) | 5 | 5 | 5 | 4 | 4 | 4 | 4 | 4 |
| Evaluation of physical properties | | | | | | | | |
| Izod impact (kg · cm/cm) | 17.0 | 13.3 | 16.3 | 17.6 | 15.4 | 16.1 | 16.1 | 15.8 |
| Luster (%) | 87 | 83 | 81 | 90 | 88 | 87 | 83 | 82 |
| Amount of fish eyes in extrusion into sheet | | | | | | | | |
| 0.1 mm$^2$ > (per 100 cm$^2$) | 8 | 10 | 11 | 10 | 12 | 9 | 11 | 13 |
| 0.1–0.2 mm$^2$ (per 100 cm$^2$) | 1 | 2 | 2 | 2 | 1 | 3 | 2 | 1 |
| 0.3 mm$^2$ < (per 100 cm$^2$) | 0 | 0 | 0 | 0 | 0 | 0 | 0 | 0 |
| Analytical results | | | | | | | | |
| Gelation degree of rubber (%) | 3.2 | 0.4 | 4.0 | 1.0 | 0.5 | 0.4 | 4.1 | 0.8 |
| Grafting degree (%) | 88 | 90 | 86 | 80 | 81 | 81 | 89 | 88 |
| Delamination test | Good | Good | Good | Good | Good | Good | Good | Good |
| Amount of unreacted organic peroxide | | | | | | | | |
| Half-life period (hr) | 0.045 | 0.17 | 0.62 | 0.048 | 0.16 | 0.54 | 0.085 | 0.33 |
| Residual amount (× 10$^{-2}$ wt. parts) | 4.2 × 10$^{-6}$ | 0.33 | 1.31 | 0.074 | 0.15 | 0.30 | 0.028 | 0.73 |

| | Example 9 | Example 10 | Example 11 | Example 12 | Remarks |
|---|---|---|---|---|---|
| Treatment with peroxide | | | | | |
| Peroxide type | Cumene hydroperoxide | Cumene hydroperoxide | t-Butyl-peroxy-i-propyl-carbonate | Benzoyl peroxide | t-Butyl-peroxy-i-propyl-carbonate |
| Amount (wt. parts) | 2 | 1 | 0.05 | 0.5 | 0.2 |
| Treating temperature (°C.) | 170 | 160 | 120 | | 140 |
| Treating time (hr) | 2.5 | 5.0 | 2.5 | | 1.0 |
| Graft copolymerization | | | | | |

TABLE 1-continued

| | | | | | |
|---|---|---|---|---|---|
| Initiator type | — | — | — | — | |
| Amount (wt. parts) | — | — | — | — | |
| Polymerization temperature (°C.) | 150 | 150 | 150 | 140 | |
| Polymerization time (hr) | 4 | 4 | 4 | 5 | |
| Evaluation of physical properties | | | | | |
| Izod impact (kg . cm/cm) | 17.2 | 18.2 | 16.5 | 18.5 | ASTM D256-56 |
| Luster (%) | 85 | 88 | 83 | 85 | ASTM D523 |
| Amount of fish eyes in extrusion into sheet | | | | | |
| 0.1 mm$^2$ > (per 100 cm$^2$) | 10 | 12 | 13 | 12 | The number of fish eyes in |
| 0.1–0.2 mm$^2$ (per 100 cm$^2$) | 2 | 2 | 2 | 2 | a 10 cm × 10 cm × 0.05 mm |
| 0.3 mm$^2$ < (per 100 cm$^2$) | 0 | 0 | 0 | 0 | sheet was calculated from a dust counting chart |
| Analytical results | | | | | |
| Gelation degree of rubber (%) | 2.1 | 1.0 | 4.8 | 2.5 | |
| Grafting degree (%) | 84 | 83 | 90 | 74 | |
| Delamination test | Good | Good | Good | Good | |
| Amount of unreacted organic peroxide | | | | | $I = 0.5^{T/t} \cdot I_o$ |
| Half-life period (hr) | 0.27 | 0.70 | 0.62 | 0.025 | 0.045 |
| | | | | | I:Residual amount (wt. parts) |
| | | | | | I$_o$:Amount added (wt. parts) |
| Residual amount (× 10$^{-2}$ wt. parts) | 0.32 | 0.73 | 0.31 | 3.9 × 10$^{-29}$ | 4.2 × 10$^{-6}$ |
| | | | | | T:Treating time (hr) |
| | | | | | t:Half-life period (hr) |

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Treatment with peroxide | | | | | | | |
| Peroxide type | — | — | — | — | — | t-Butylperoxy-i-propylcarbonate | Same as left |
| Amount (wt. parts) | — | — | — | — | — | 0.2 | 0.4 |
| Treating temp. (°C.) | — | — | — | — | — | 140 | 140 |
| Treating time (hr) | — | — | — | — | — | 1.0 | 1.0 |
| Graft copolymerization | | | | | | | |
| Initiator type | — | t-Butyl-peroxy-i-propyl carbonate | Dicumyl peroxide | Benzoyl peroxide | t-Butylperoxybenzoate | Dicumyl peroxide | — |
| Amount (wt. parts) | — | 0.2 | 0.3 | 1 | 1 | 0.3 | — |
| Polymerization temp. (°C.) | 140 | 140 | 140 | 110 | 130 | 140 | 140 |
| Polymerization time (hr) | 5 | 3 | 3 | 6 | 4 | 3 | 5 |
| Evaluation of physical properties | | | | | | | |
| Izod impact (kg . cm/cm) | 14.6 | 17.5 | 17.0 | 15.5 | 16.0 | 17.5 | 15.0 |
| Luster (%) | 90 | 81 | 85 | 80 | 86 | 80 | 64 |
| Amount of fish eyes in extrusion into sheet | | | | | | | |
| 0.1 mm$^2$ > (per 100 cm$^2$) | 8 | 70 | 60 | 62 | 58 | 60 | 12 |
| 0.1–0.2 mm$^2$ (per 100 cm$^2$) | 2 | 15 | 10 | 8 | 16 | 12 | 2 |
| 0.3 mm$^2$ < (per 100 cm$^2$) | 0 | 8 | 4 | 4 | 2 | 5 | 0 |
| Analytical results | | | | | | | |
| Gelation degree of rubber (%) | — | — | — | — | — | 3.2 | 9.7 |
| Grafting degree (%) | 35 | 75 | 65 | 78 | 70 | 95 | 60 |
| Delamination test | Very bad | Good | Bad | Good | Good | Good | Bad |
| Amount of unreacted organic peroxide | | | | | | | |
| Half-life period (hr) | — | — | — | — | — | 0.045 | 0.045 |
| Residual amount (× 10$^{-2}$ wt. parts) | — | — | — | — | — | 4.2 × 10$^{-6}$ | 8.3 × 10$^{-6}$ |

| | Comp. Ex. 8 | Comp. Ex. 9 | Comp. Ex. 10 | Comp. Ex. 11 | Comp. Ex. 12 | Comp. Ex. 13 |
|---|---|---|---|---|---|---|
| Treatment with peroxide | | | | | | |
| Peroxide type | t-Butyl-peroxy-i-propyl-carbonate | Same as left | Dicumyl peroxide | Dicumyl peroxide | Cumene hydroperoxide | t-Butylperoxy-i-propylcarbonate |
| Amount (wt. parts) | 0.2 | 0.05 | 1 | 0.5 | 1 | 0.2 |
| Treating temp. (°C.) | 140 | 120 | 160 | 140 | 160 | 140 |
| Treating time (hr) | 2.0 | 1.0 | 1.0 | 1.0 | 4 | 1 (Rubber was separated by methanol coagulation and dried) |
| Graft copolymerization | | | | | | |
| Initiator type | — | — | — | — | — | — |
| Amount (wt. parts) | — | — | — | — | — | — |
| Polymerization temp. (°C.) | 140 | 140 | 150 | 150 | 150 | 140 |
| Polymerization time (hr) | 5 | 5 | 4 | 4 | 4 | 5 |
| Evaluation of physical properties | | | | | | |
| Izod impact (kg . cm/cm) | 9.1 | 16.5 | 14.4 | 15.9 | 17.3 | 15.1 |
| Luster (%) | 39 | 83 | 75 | 85 | 85 | 65 |
| Amount of fish eyes in extrusion into sheet | | | | | | |
| 0.1 mm$^2$ > (per 100 cm$^2$) | 12 | 40 | 11 | 43 | 30 | 10 |

TABLE 2-continued

| | | | | | | |
|---|---|---|---|---|---|---|
| 0.1–0.2 mm² (per 100 cm²) | 2 | 8 | 1 | 9 | 6 | 2 |
| 0.3 mm² < (per 100 cm²) | 0 | 3 | 0 | 2 | 2 | 0 |
| Analytical results | | | | | | |
| Gelation degree of rubber (%) | 21.9 | 0.5 | 5.8 | 0.4 | 0.8 | 3.2 |
| Grafting degree (%) | 55 | 80 | 64 | 82 | 85 | 58 |
| Delamination test | Very bad | Good | Bad | Good | Good | Very bad |
| Amount of unreacted organic peroxide | | | | | | |
| Half-life period (hr) | 0.045 | 0.62 | 0.048 | 0.54 | 0.7 | 0.045 |
| Residual amount ($\times 10^{-2}$ wt. parts) | $8.3 \times 10^{-6}$ | 1.6 | $2.7 \times 10^{-4}$ | 13.4 | 1.9 | $4.2 \times 10^{-6}$ |

What is claimed is:

1. A process for the preparation of a rubber-modified thermoplastic resin, which comprises:
   treating an ethylene-proylene-non-conjugated diene copolymer rubber with a peroxide in a hydrocarbon or halogenated hydrocarbon solvent to obtain a rubber solution having a rubber gelation degree of not more than 5% and containing substantially no unreacted peroxide;
   adding to said rubber solution without isolating the treated copolymer a vinyl monomer mixture consisting of an aromatic alkenyl compound and a polar vinyl compound; and heating the resulting mixture in the substantial absence of a polymerization initiator to graft-copolymerize the monomer mixture on the rubber.

2. The process according to claim 1, wherein the peroxide is used in an amount of 0.1–10 parts by weight per 100 parts by weight of the rubber.

3. The process according to claim 1, wherein the amount of the peroxide is 0.4–5 parts by weight per 100 parts by weight of the rubber.

4. The process according to claim 2 or 3, wherein the solvent is used in an amount of 300–4,000 parts by weight per 100 parts by weight of the rubber.

5. The process according to claim 2 or 3, wherein the amount of the solvent is 500–1,000 parts by weight per 100 parts by weight of the rubber.

6. The process according to claim 1, 2 or 3, wherein the treatment with a peroxide is effected at a temperature of 50°–180° C. for a period of 0.5–5 hours.

7. The process according to claim 1, 2 or 3, wherein the peroxide is at least one member selected from the group consisting of hydrogen peroxide, t-butylperoxy-i-propylcarbonate, t-butylperoxybenzoate, dicumyl peroxide, di-t-butyl peroxide, benzoyl peroxide, lauroyl peroxide, methyl ethyl ketone peroxide and cumene hydroperoxide.

8. The process according to claim 1, 2, or 3, wherein the peroxide is t-butylperoxy-i-propylcarbonate, dicumyl peroxide or cumene hydroperoxide.

9. The process according to claim 1, wherein the non-conjugated diene component of the rubber is selected from the group consisting of norbornenes, cyclic dienes and aliphatic dienes.

10. The process according to claim 1, wherein the non-conjugated diene component of the rubber is 5-ethylidene-2-norbornene or dicyclopentadiene.

11. The process according to claim 1, wherein the solvent is an aromatic hydrocarbon or a halogenated hydrocarbon.

12. The process according to claim 1, wherein the solvent is benzene, toluene, ethylbenzene or chlorobenzene.

13. The process according to claim 1, wherein the vinyl monomer is composed of an aromatic alkenyl compound selected from the group consisting of styrene, α-methylstyrene, vinyltoluene and halogenated styrene and a polar vinyl compound selected from the group consisting of acrylonitrile, methacrylonitrile and methyl methacrylate.

14. The process according to claim 1, wherein the vinyl monomer is composed of styrene and acrylonitrile.

15. The process according to claim 14, wherein the weight ratio of styrene:acrylonitrile is 80:20 to 60:40.

16. The process according to claim 1, wherein the amount of the vinyl monomer is such that the rubber content in the final product resin is 5–30% by weight.

17. The process according to claim 1, wherein the graft-copolymerization is carried out at a temperature of 100°–200° C. in the absence of any polymerization initiator.

18. The process according to claim 1, wherein said rubber solution containing substantially no unreacted peroxide contains not more than 0.01 part by weight of peroxide per 100 parts by weight of the total weight of rubber and the weight of vinyl monomer graft-copolymerized thereon as calculated from the half-life period of the treatment step.

* * * * *